(12) United States Patent
Tsai

(10) Patent No.: US 7,288,754 B2
(45) Date of Patent: Oct. 30, 2007

(54) OPTICAL RECEIVER

(75) Inventor: Chia-Ming Tsai, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 615 days.

(21) Appl. No.: 10/926,062

(22) Filed: Aug. 26, 2004

(65) Prior Publication Data

US 2005/0175359 A1 Aug. 11, 2005

(30) Foreign Application Priority Data

Feb. 6, 2004 (TW) .............................. 93102746 A

(51) Int. Cl.
*H01J 40/14* (2006.01)
*H04B 10/06* (2006.01)

(52) U.S. Cl. .................... 250/214 A; 330/59; 330/202; 330/308

(58) Field of Classification Search ............ 250/214 A; 330/308, 202, 209, 59
See application file for complete search history.

(56) References Cited

U.S. PATENT DOCUMENTS

| | | | |
|---|---|---|---|
| 5,329,115 A | 7/1994 | Lim | |
| 5,982,232 A | 11/1999 | Rogers | |
| 6,307,196 B1 * | 10/2001 | Thompson et al. | ..... 250/214 A |
| 6,323,734 B1 | 11/2001 | Henrion et al. | |
| 6,359,517 B1 * | 3/2002 | Colaco | ........................ 330/308 |
| 6,720,827 B2 * | 4/2004 | Yoon | ............................ 330/85 |
| 6,999,687 B2 * | 2/2006 | Tsai | ............................ 398/202 |
| 7,105,797 B2 * | 9/2006 | Kimura | .................. 250/214 A |
| 2003/0161640 A1 * | 8/2003 | Kimura | ....................... 398/202 |
| 2005/0175359 A1 * | 8/2005 | Tsai | ............................ 398/202 |

\* cited by examiner

*Primary Examiner*—John R. Lee
(74) *Attorney, Agent, or Firm*—Birch, Stewart, Kolasch & Birch, LLP

(57) ABSTRACT

An optical receiver. The optical receiver includes a photodiode, a differential transimpedance amplifier, a transistor, and a current source. When the photodiode receives an optical signal, a current signal transmitted from a cathode of the photodiode to an anode thereof is generated. Two input terminals of the differential transimpedance amplifier couple the current signal, and the differential transimpedance amplifier converts the current signal to a voltage signal. In addition, voltage variation of the cathode is coupled to the anode through a voltage follower composed by the transistor and the current source. As a result, voltage of the cathode and that of the anode vary in phase, effectively decreasing a value of the photodiode parasitic capacitance and improving operating bandwidth.

18 Claims, 3 Drawing Sheets

OPTICAL RECEIVER

This Non-provisional application claims priority under 35 U.S.C. § 119(a) on Patent Application No(s). 093102746 filed in Taiwan, Republic of China on Feb. 6, 2004, the entire contents of which are hereby incorporated by reference.

BACKGROUND

The invention relates to an optical receiver, and in particular to an optical receiver comprising a voltage follower.

FIG. 1 is a circuit diagram of a conventional optical receiver with a differential current-sensing transimpedance amplifier. As shown in FIG. 1, a differential transimpedance amplifier T1 comprises resistors R10 and R11 and a differential amplifier OP1. A cathode of a photodiode D1 is coupled to a noninverting input terminal IN+, and an anode thereof is coupled to an inverting input terminal IN−. The resistor R10 is coupled between the noninverting input terminal IN+ and an inverting output OUT−, and the resistor R11 is coupled between the inverting input terminal IN− and a noninverting output terminal OUT+. While receiving an optical signal, the photodiode D1 generates a current signal I1 and the current signal I1 is converted into a voltage signal Vout1 by the following differential transimpedance amplifier T1. Compared with a conventional single-ended transimpedance amplifier, such as a common-cathode transimpedance amplifier or a common-anode transimpedance amplifier, the transimpedance gain and the signal-to-noise ratio (SNR) of the differential current-sensing transimpedance amplifier T1 are increased by 6 dB and 3 dB respectively. Therefore a better receive sensitivity can be achieved theoretically.

In the optical receiver of FIG. 1, however, the current signal I1 transmits from the noninverting input terminal IN+ to the cathode of the photodiode D1 and then transmits from the anode thereof to the inverting input terminal IN−. Thus the voltage signals at the anode and the cathode of the photodiode D1 are out of phase. The resulting large differential voltage across the photodiode D1 leads to a large transient current component required for charging and discharging the photodiode parasitic capacitance Cd1. Therefore, both the operating bandwidth and the transimpedance gain of the optical receiver are strongly limited by the photodiode parasitic capacitance Cd1. It is assumed that the equivalent input resistance of each input terminal of the differential transimdepance amplifier T1 is rin10 and an ideal differential transimpedance amplifier is used, the operating bandwidth of the optical receiver can be represented by the following equation:

$$B1 = \frac{1}{2\pi(2 rin10 \cdot cd1)}$$

wherein, B1 is the operating bandwidth of the optical receiver, cd1 is a value of the photodiode parasitic capacitance Cd1.

According to the above equation, the operating bandwidth of the differential-receiving optical receiver is reduced to one half that using a single-ended transimpedance amplifier. The bandwidth shrinkage is due to the out-of-phase relationship between the voltage signals at the two terminals of the photodiode D1. If the differential voltage signal across the photodiode D1 can be reduced, then the undesirable transient effect due to the photodiode parasitic capacitance Cd1 will be significantly suppressed. Moreover, in the circuitry of the optical receiver in FIG. 1, since an appropriate reverse bias cannot be provided to the photodiode D1, the optical receiver is not suitable for applications demanding high transmission rate and wide dynamic range.

SUMMARY

Accordingly, embodiments of the invention provide an optical receiver that ameliorates disadvantages of the related art.

Accordingly, the invention provides an optical receiver comprising a photodiode, a differential transimdepance amplifier, a transistor, and a first current source. The photodiode has a first terminal and a second terminal and generates a current signal transmitted from the first terminal to the second terminal while receiving an optical signal. The differential transimdepance amplifier has a first input terminal coupled to the first terminal and a second input terminal and converts the current signal to a first voltage signal. The transistor has a control terminal coupled to the first terminal, a third terminal coupled to the second terminal, and a fourth terminal coupled to the second input terminal. The first current source is coupled between the third terminal and a ground. When the photodiode receives the optical signal, the current signal is coupled to the first input terminal directly and to the second input terminal through the transistor. The transistor couples a voltage variation of the first terminal to the second terminal, such that voltage signals of the first and the second terminals vary in phase.

Embodiments of the invention further provide an optical receiver comprising a photodiode, a differential transimdepance amplifier, a transistor, and a first current source. The photodiode has a first terminal and a second terminal and generates a current signal transmitted from the first terminal to the second terminal when receiving an optical signal. The differential transimdepance amplifier has a first input terminal and a second input terminal coupled to the second terminal and converts the current signal to a first voltage signal. The transistor has a control terminal coupled to the second terminal, a third terminal coupled to the first terminal, and a fourth terminal coupled to the first input terminal. The first current source is coupled between the third terminal and a voltage source. When the photodiode receives the optical signal, the current signal is coupled to the second input terminal directly and to the first input terminal through the transistor, and the transistor couples a voltage variation of the second terminal to the first terminal, such that voltage signals of the first and the second terminals vary in phase.

A detailed description is given in the following embodiments with reference to the accompanying drawings.

BRIEF DESCRIPTION OF THE DRAWINGS

Various aspects of embodiments of the invention can be more fully understood by reading the subsequent detailed description and examples with references made to the accompanying drawings, wherein.

DETAILED DESCRIPTION

First Embodiment

Figure 1:
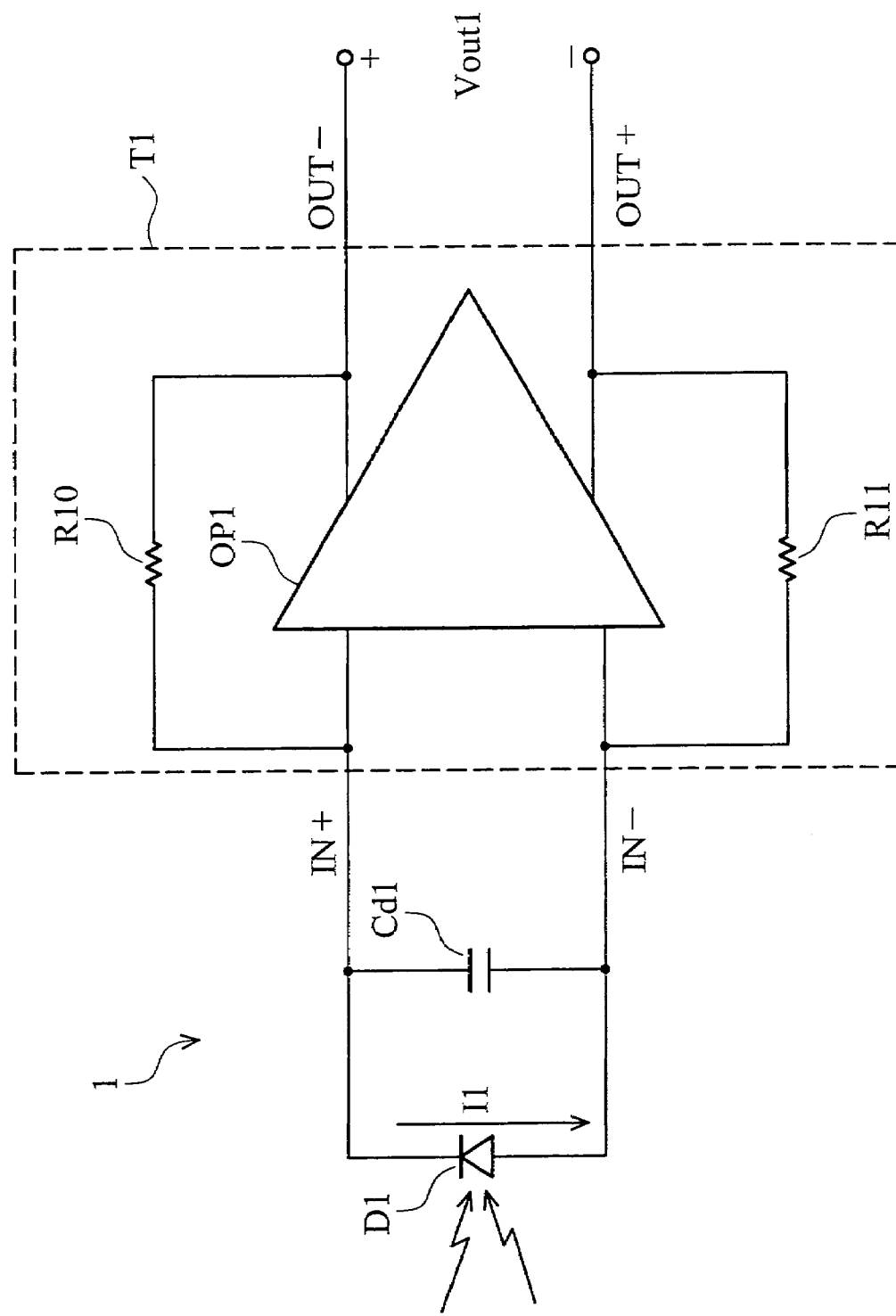
FIG. 1 is a circuit diagram of a conventional optical receiver with a differential-sensing transimpedance amplifier.
Figure 2:
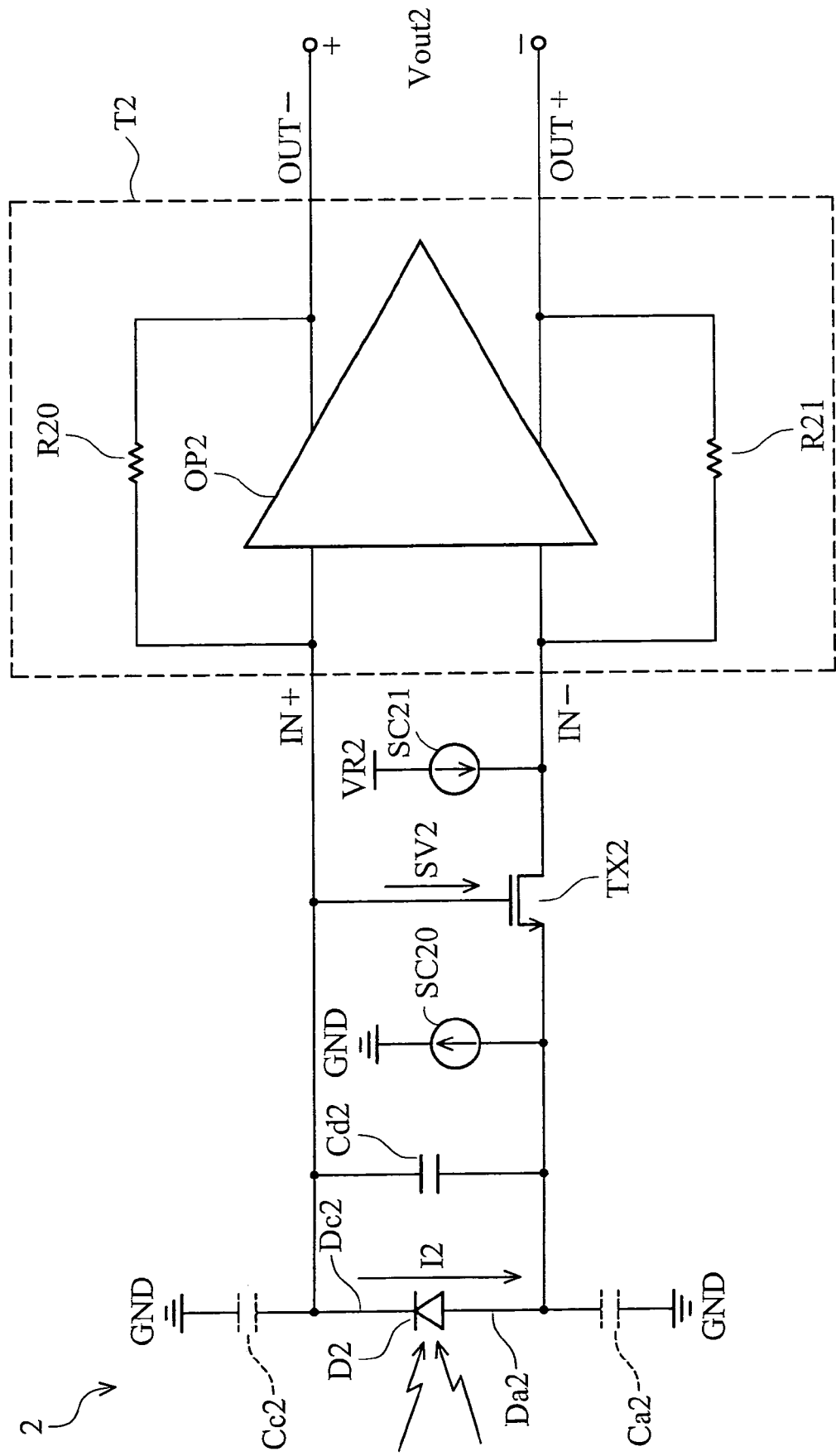
FIG. 2 is a circuit diagram of an optical receiver according to a first embodiment of the invention.

FIG. 2 is a circuit diagram of an optical receiver according to a first embodiment of the invention. The optical receiver 2 comprises a photodiode D2, a differential transimpedance amplifier T2, an NMOS transistor Tx2, and current sources SC20 and SC21. The differential transimpedance amplifier T2 comprises resistors R20 and R21 and a differential amplifier OP2. The current sources SC20 and SC21 provide bias current for the transistor Tx2. The amplifier OP2 has two input terminals coupled to a noninverting input terminal IN+ and an inverting input terminal IN− of the differential transimpedance amplifier T2 respectively and two output terminals coupled to a noninverting output terminal OUT+ and an inverting output terminal OUT− thereof respectively. The photodiode D2 has a parasitic capacitor Cd2. The resistor R20 is coupled between the noninverting input terminal IN+ and the inverting output terminal OUT− of the differential transimpedance amplifier T2, and the resistor R21 is coupled between the inverting input terminal IN− and the noninverting output terminal OUT+ thereof. The resistors R20 and R21 are substantially equal in value. The transistor Tx2 has a gate coupled to a cathode Dc2 of the photodiode D2, a source coupled to an anode Da2 thereof, and a drain coupled to the inverting input terminal IN−. The cathode Dc2 is directly coupled to the noninverting input terminal IN+, and the anode Da2 is coupled to the inverting input terminal IN− through the transistor Tx2. The current source SC20 is coupled between a ground GND and the source of the transistor Tx2, and the current source S21 is coupled between a voltage source VR2 and the drain of the transistor Tx2.

When receiving an optical signal, the photodiode D2 generates a current signal I2 transmitted from the cathode Dc2 to the anode Da2. Thus a voltage signal SV2 is generated at the cathode Dc2. A voltage follower comprising the transistor Tx2 and the current source SC20 couples the voltage signal SV2 to the anode Da2. As a result, voltage signals of the cathode Dc2 and the anode Da2 vary in phase and the differential voltage signal across the photodiode parasitic capacitance Cd2 is greatly reduced. Therefore, the negative effect of the photodiode parasitic capacitance Cd2 on the operating bandwidth is suppressed.

The transistor Tx2 serves as not only a voltage follower but also a unit-gain current buffer. The current I2 is directly coupled to the noninverting input terminal IN+ and it is also coupled to the inverting input terminal IN− through the transistor Tx2. The differential transimpedance amplifier T2 converts the current signal I2 to a voltage signal Vout2. The voltage signal Vout2 is equal to the voltage difference between the output terminals OUT− and OUT+, generated by the differential transimpedance amplifier T2 according the current I2, and is provided to back-end devices for data decision.

In the first embodiment, since the cathode Dc2 is coupled to the gate of the transistor Tx2, a voltage Vgs between the gate and the source thereof can serve as a reverse bias applied to the photodiode D2. Thus, the optical receiver 2 of this embodiment does not require an extra reverse-bias control circuit.

The effect of the grounded parasitic capacitance of the cathode Dc2 and anode Da2 are further described with reference to FIG. 2. The grounded parasitic capacitance of the cathode Dc2 and the anode Da2 are respectively represented as capacitors Cc2 and Ca2. Charging/discharging electric charges of the cathode Dc2 and the anode Da2 to the ground GND are represented by the following equations:

$$Qc = cc2 \times \Delta Vc$$

$$Qa = ca2 \times \Delta Va$$

wherein, Qc and Qa are the charging/discharging electric charges of the cathode Dc2 and the anode Da2 to the ground GND, cc2 and ca2 are values of the capacitors Cc2 and Ca2, $\Delta Vc$ and $\Delta Va$ are variations of voltage signals of the cathode Dc2 and the anode Da2, respectively.

According to the phase relationship between the voltage signals of the cathode Dc2 and the anode Da2, the charging/discharging phenomena of the capacitor Cc2 causes a bandwidth degradation at the cathode Dc2, while the charging/discharging phenomena of the capacitor Ca2 causes a bandwidth enhancement at the cathode Da2. It is assumed that the values cc2 and ca2 of the capacitor Cc2 and Ca2 are equal to a value c2. Considering a differential current signal provided to the differential transimpedance amplifier T2 through the cathode Dc2 and the anode Da2, the differential charging/discharging electric charges generated by the capacitors Cc2 and Ca2 are represented by the following equation:

$$Qdiff = Qc - Qa = c2 \times (\Delta Vc - \Delta Va) = (c2 \times i2)/Gm$$

wherein, Qdiff is the differential charging/discharging electric charges due to the capacitors Cc2 and Ca2, i2 is a value of the current signal I2, Gm is the transconductance of the transistor Tx2.

According to the above analysis, when Gm is increased, the differential charging/discharging electric charge Qdiff is decreased. Thus, the effect on the operating bandwidth of the optical receiver by the capacitors Cc2 and Ca2 is automatically cancelled. It leads to an enlarged tolerance against the grounded parasitic capacitance.

Second Embodiment

Figure 3:
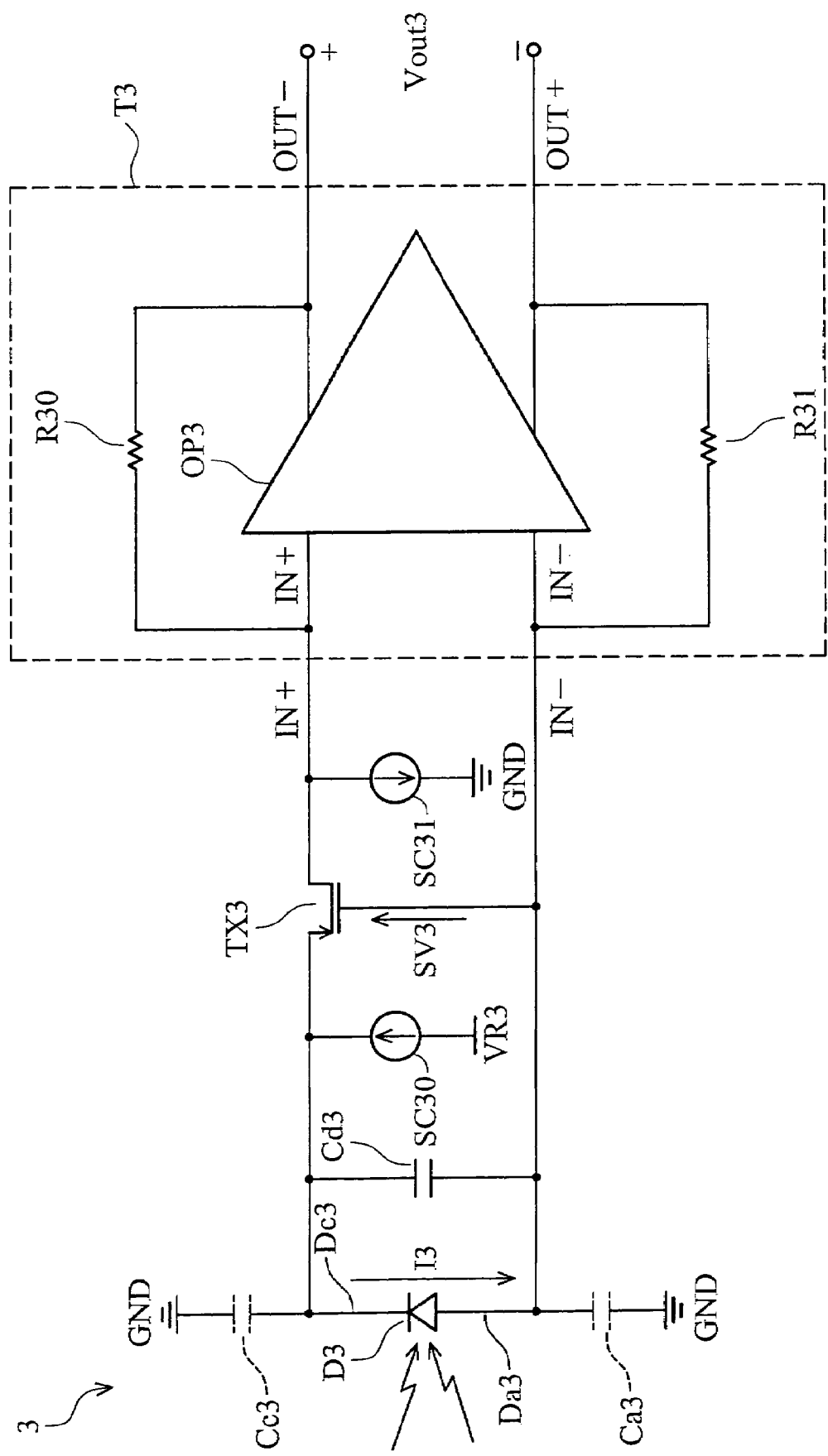
FIG. 3 is a circuit diagram of an optical receiver according to a second embodiment of the invention.

FIG. 3 is a circuit diagram of a second embodiment of an optical receiver according to the invention. The optical receiver 3 comprises a photodiode D3, a differential transimpedance amplifier T3, a PMOS transistor Tx3, and current sources SC30 and SC31. The differential transimpedance amplifier T3 comprises resistors R30 and R31 and a differential amplifier OP3. The current sources SC30 and SC31 provide bias current for the transistor Tx3. The photodiode D3 has a parasitic capacitance Cd3. The amplifier OP3 has two input terminals coupled to a noninverting input terminal IN+ and an inverting input terminal IN− of the differential transimpedance amplifier T3 respectively and two output terminals coupled to a noninverting output terminal OUT+ and an inverting output terminal OUT− thereof respectively. The resistor R30 is coupled between The noninverting input terminal IN+ and The inverting output terminal OUT− of the differential transimpedance amplifier T3, and the resistor R31 is coupled between The inverting input terminal IN− and The noninverting output terminal OUT+ thereof. The resistors R30 and R31 are substantially equal in value. The transistor Tx3 has a gate coupled to an anode Da3 of the photodiode D3, a source coupled to a cathode Dc3 thereof, and a drain coupled to the noninverting input terminal IN+. The anode Da3 is directly coupled to the noninverting input terminal IN−, and the cathode Dc3 is coupled to the inverting input terminal IN+ through the transistor Tx3. The current source SC30 is coupled between a voltage source VR3 and the source of the transistor Tx3, and the current source S31 is coupled between a ground GND and the drain of the transistor Tx3.

When receiving an optical signal, the photodiode D3 generates a current signal I3 transmitted from the cathode Dc3 to the anode Da3. Thus a voltage signal SV3 is generated at the anode Da3. A voltage follower comprising the transistor Tx3 and the current source SC30 couples the voltage signal SV3 to the cathode Dc3. As a result, voltage signals of the anode Da3 and the cathode Dc3 vary in phase and the differential voltage signal across the photodiode parasitic capacitance Cd3 is greatly reduced. Therefore, the negative effect of the photodiode parasitic capacitance Cd3 on the operating bandwidth is suppressed.

The transistor Tx3 serves as not only a voltage follower but also a unit-gain current buffer. The current I3 is directly coupled to the inverting input terminal IN− and it is also coupled to the noninverting input terminal IN+ through the transistor Tx3. The differential transimpedance amplifier T3 converts the current signal I3 to a voltage signal Vout3. The voltage signal Vout3 is equal to the voltage difference between the output terminals OUT− and OUT+, generated by the differential transimpedance amplifier T3 according the current I3, and is provided to back-end devices for data decision.

In the second embodiment, since the cathode Dc3 is coupled to the source of the transistor Tx3, a voltage Vsg between the source and the gate thereof can serve as reverse bias applied to the photodiode D2. Thus, the optical receiver 3 of this embodiment does not require an extra reverse-bias control circuit.

Moreover, according to the previously described analysis of the first embodiment, the effect caused by the grounded parasitic capacitance of the cathode Dc3 and anode Da3 is automatically cancelled due to the in-phase relationship between the voltage signal of the cathode Dc3 and anode Da3.

As previously described, in an optical receiver of the invention, the voltage signal of a cathode and an anode of a photodiode vary in phase, and the differential voltage across the photodiode is greatly reduced. Thus, the negative effect of the photodiode parasitic capacitance on the operating bandwidth is significantly suppressed. Moreover, due to in-phase relationship between the voltage signal of the cathode and anode of the photodiode, the effect on the operating bandwidth of the differential transimdepance amplifier by the grounded parasitic capacitance is automatically cancelled.

In the described embodiments, the transistor Tx2 can be an NMOS transistor, an NPN bipolar transistor, or any other element with equivalent circuitry according to requirements, and the transistor Tx3 can be a PMOS transistor, a PNP bipolar transistor, or any other element with equivalent circuitry according to requirements.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An optical receiver, comprising:
    a photodiode having a first terminal and a second terminal and generating a current signal transmitted from the first terminal to the second terminal when receiving an optical signal;
    a differential transimdepance amplifier having a first input terminal coupled to the first terminal and a second input terminal and converting the current signal to a first voltage signal;
    a transistor having a control terminal coupled to the first terminal, a third terminal coupled to the second terminal, and a fourth terminal coupled to the second input terminal; and
    a first current source coupled between the third terminal and a ground;
    wherein when the photodiode receives the optical signal, the current signal is coupled to the first input terminal directly and to the second input terminal through the transistor, and the transistor couples a voltage variation of the first terminal to the second terminal, such that voltage signals of the first and the second terminals vary in phase.

2. The optical receiver as claimed in claim 1 further comprising a second current source coupled between the fourth terminal and a voltage source and providing a bias to the transistor.

3. The optical receiver as claimed in claim 2, wherein the first and the second current sources provide equal direct current.

4. The optical receiver as claimed in claim 1, wherein the differential transimdepance amplifier further comprises a first output terminal and a second output terminal.

5. The optical receiver as claimed in claim 3, wherein the differential transimdepance amplifier comprises:
    an amplifier having two input terminals respectively coupled to the first and second input terminals and two output terminals coupled to the first and second output terminals;
    a first resistor coupled between the first input terminal and the first output terminal; and
    a second resistor coupled between the second input terminal and the second output terminal.

6. The optical receiver as claimed in claim 5, wherein the first and the second resistors are substantially equal in value.

7. The optical receiver as claimed in claim 4, wherein the differential transimdepance amplifier outputs a second voltage signal from the first output terminal and a third voltage signal from the second output terminal, the difference between the second and the third voltage signal is equal to the first voltage signal.

8. The optical receiver as claimed in claim 1, wherein the transistor is an NMOS transistor.

9. The optical receiver as claimed in claim 1, wherein the transistor is an NPN bipolar transistor.

10. An optical receiver, comprising:
    a photodiode having a first terminal and a second terminal and generating a current signal transmitted from the first terminal to the second terminal when receiving an optical signal;
    a differential transimdepance amplifier having a first input terminal and a second input terminal which is coupled to the second terminal and converting the current signal to a first voltage signal;
    a transistor having a control terminal coupled to the second terminal, a third terminal coupled to the first terminal, and a fourth terminal coupled to the first input terminal; and
    a first current source coupled between the third terminal and a voltage source;
    wherein when the photodiode receives the optical signal, the current signal is coupled to the second input terminal directly and to the first input terminal through the transistor, and the transistor couples a voltage variation of the second terminal to the first terminal, such that voltage signals of the first and the second terminals vary in phase.

11. The optical receiver as claimed in claim 10 further comprising a second current source coupled between the fourth terminal and a ground and providing a bias to the transistor.

12. The optical receiver as claimed in claim 11, wherein the first and the second current sources provide equal direct current.

13. The optical receiver as claimed in claim 10, wherein the differential transimdepance amplifier further comprises a first output terminal and a second output terminal.

14. The optical receiver as claimed in claim 13, wherein the differential transimdepance amplifier comprises:
    an amplifier having two input terminals respectively coupled to the first and second input terminals and two output terminals coupled to the first and second output terminals;
    a first resistor coupled between the first input terminal and the first output terminal; and
    a second resistor coupled between the second input terminal and the second output terminal.

15. The optical receiver as claimed in claim 14, wherein values of the first and the second resistors are substantially equal in value.

16. The optical receiver as claimed in claim 13, wherein the differential transimdepance amplifier outputs a second voltage signal from the first output terminal and a third voltage signal from the second output terminal, the difference between the second and the third voltage signal is equal to the first voltage signal.

17. The optical receiver as claimed in claim 10, wherein the transistor is a PMOS transistor.

18. The optical receiver as claimed in claim 10, wherein the transistor is a PNP bipolar transistor.

* * * * *